April 18, 1933.   F. M. POTTER   1,904,525
CABLE
Filed Feb. 4, 1928

Inventor
Frank M. Potter
By his Attorneys
Emery, Booth, Janney & Varney

Patented Apr. 18, 1933

1,904,525

UNITED STATES PATENT OFFICE

FRANK M. POTTER, OF ROME, NEW YORK, ASSIGNOR TO GENERAL CABLE CORPORATION, OF NEW YORK, N. Y., A CORPORATION OF NEW JERSEY

CABLE

Application filed February 4, 1928. Serial No. 251,765.

The present invention relates to insulated electric cables and particularly to conductors which are adapted for use in earthen trenches, in yards of industrial plants, and other places where cables are usually subjected to extremes of weather, heat, cold abrasion and like conditions of service. Certain features of the invention, however, as will be pointed out, have a more general application and may be associated advantageously with cables of many other different types than those which are especially discussed herein. Among the objects of the invention are the provision of electrical conductors or cables which will be particularly resistant to heat, moisture, soil acidity, alkalinity, oxidation, abrasion or impact; which will be relatively inexpensive to manufacture and which, in the enumerated and other respects, will be eminently satisfactory for the purposes for which they are designated.

Further objects of the invention will be apparent from the following description of two representative embodiments thereof.

The present invention has been developed to provide a non-metallic sheathed cable to supplant metal (usually lead) sheated cables in uses for which the latter have been found unsuited either because of their inherent deficiencies, because of their relatively excessive expense, or because of objectionable characteristics, such as induction. For example in rural communities and in smaller towns it is quite customary to lay cables in shallow earthen trenches without any protective covering. While lead covered cable has proved highly satisfactory when used in underground vaults or tunnels it has usually given considerable trouble when laid directly in the ground because of the ease with which it is punctured. For this reason when lead covered cable has been buried in the ground it has been supplied with a steel strip or jacket to protect it from abrasion or puncture. This not only increases the already high cost of the cable but does not provide the desired long life since the steel jacket soon rusts away leaving the lead exposed and easily punctured and subject to crystallization or electrolysis because of direct contact with the soil. Also the jointing of lead cable is expensive since highly skilled workmen are required to wipe the joints and such skilled workmen are usually not available in small communities. According to the present invention a cable is provided which is practically equal to lead sheathed cable from the standpoint of moisture resistance but which is very much less expensive to purchase and install than lead cable and which, under exacting conditions of service, has a considerably longer expectancy of life than lead cable.

When laid along undulating surfaces cables of known types, and particularly plural conductor cables, by reason of the valleys between conductors for which no satisfactory filler has heretofore been provided, have wicked moisture entering through small punctures or faulty joints along their length toward low sections to cause rotting at such low points. The present invention not only provides a cable which effectually prevents the entry of external moisture but one which will not permit the traveling or wicking of moisture along the valleys to collection points where it might cause damage. Attempts have been made to provide a non-metallic type of cable for use in earthen trenches and while fairly good results have been attained for short periods of time after the installation where single conductor cables have been used and these separate cables laid a considerable distance apart, there has not been produced, so far as applicant is aware, a cable of this type which does not quickly deteriorate and allow leakage of moisture therein with consequent electric leakage or short circuits between the several conductors. Obviously the expense of providing and installing several separate single conductor cables is considerable and even with their inherent high cost and disadvantages lead cables have been used in preference to the available non-metallic cables.

A feature of the present cable which, as stated above, may be employed with advantage in other types of cable, is the putty or compound which is employed to seal the valleys between conductors in plural conductor cables and which also is used to saturate the braids of the cables to prevent the entry of moisture. This putty is extremely resistant to weathering since it is composed practically entirely of materials which individually are not subject to further oxidation. The materials when blended moreover, besides being extremely resistant to oxidation and weathering, form a non-hygroscopic covering which will resist, to a remarkable extent, the passage of moisture therethrough. This oxidation- and moisture-resistant compound or putty in its original state is quite plastic and is but slightly affected even by great temperature changes or age and hence will not become too soft or brittle; that is, it has a low susceptibility factor. Even when the cable has lain in the ground for long periods of time it may be bent repeatedly without causing cracking of its sheath and, when the cable is punctured, the putty, because it thus maintains its plastic state, will tend to flow or migrate toward the rupture and heal or seal the same.

The accompanying drawing shows the preferred and illustrative embodiments of the invention and therein:

Figure 1:
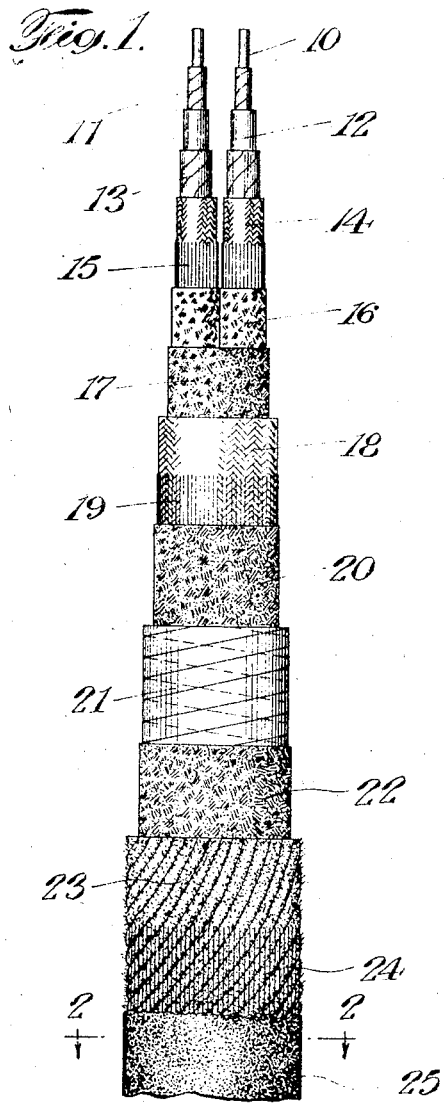
Fig. 1 is a plan view of a two conductor cable having the several sheaths of material progressively removed to show the interior construction.
Figure 2:
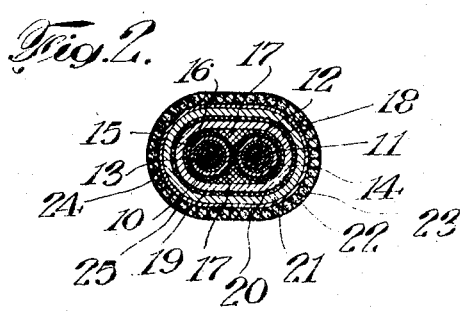
Fig. 2 is a cross section on the line 2—2 of Fig. 1.

In Figs. 1 and 2 of the drawing an insulated cable provided with two metallic conductors 10 is illustrated. Preferably each conductor 10 is served with a thin paper separator 11 to insure free stripping and over this the usual vulcanized rubber coating 12 is provided. A single wrap of rubberized tape 13 which may be of different colors for different conductors for the purpose of identification is applied tightly over the rubber coating 12, after which a fibrous braid 14, preferably of cotton, is provided. The cotton braid is thoroughly saturated with a penetrating waterproofing preparation 15 which may include asphalt, Montan wax and paraffin, followed by a coating 16 of weather and moisture-proofing putty which penetrates or impregnates the cotton braid, thoroughly caulking the same, and is squeezed or wiped off to leave a relatively thick unbroken film over the braid.

Prior to the provision of the putty specified above no material known has provided the required degree of dielectric strength, waterproofing, heat and oxidation, resistance, and continued plasticity required to build a cable which would be inexpensive and yet have a long life and give satisfactory service underground. This plastic oxidation- and moisture-resistant compound may be composed of a base of a fatty acid pitch such as stearin pitch, and a mineral filler such as asbestine. The asbestine which is in a finely divided state is added to the pitch in the amount required to give the desired consistency which preferably, at normal atmospheric temperatures is about like glazing putty and at 300° F. about like cold molasses. The amount of asbestine added will vary with the consistency of the pitch but will be between 10% and 30% of the whole. If a putty of a higher viscosity is desired as for filling the valleys of large conductor cables, fibre asbestos may also be added with the asbestine as a filler. Other mineral fillers, such as alumina, ground quartz, mica or magnesium oxide may be substituted for the magnesium silicate if desired.

Individual conductors covered as set out above are assembled in the required number for the cable. They may be laid parallel or be twisted as desired. Usually if only two conductors are used they are laid parallel and if more are used they are twisted.

The valleys between the assembled conductors are filled with an oxidation- and moisture-resistant putty compound of the type described, a sufficient amount being used to provide a thin wiped coat 17 of the same about the whole assembly. Since the putty maintains its fluidity it follows that it will tend to flow or migrate toward and heal or seal any bruise or rupture that may later be made to the completed cable. The blow of pick for example will usually merely separate the individual conductors and since the valleys between them are filled and each conductor has a separate sheath of the putty it is more than likely that the metallic conductors will remain protected.

An asbestos sheath 18, preferably braided, covers the assembly over the filling and covering coat 17 of putty. Asbestos is employed in preference to cotton or other available materials for the braid because it will not rot; will not wick moisture along the braid as cotton will do to some extent no matter how thorough a saturation has been attempted; will take moisture proofing saturants to a much higher degree than most materials, and once saturated will not absorb moisture in the event of minute mechanical defects in the cable or carelessly made taps or joints. The asbestos braid also provides mechanical protection greatly superior to a cotton braid or even a lead sheath.

The asbestos braid is first saturated with a waterproofing substance 19 which may be similar to the saturant 15 and is then filled or caulked with the putty, leaving a thin wiped coating 20 of the putty on the outside of the braid. For further mechanical protection and moisture proofing a double spiral wrapped sheath 21 of fibrous material, preferably folded kraft paper, filled with a special rotproof, moisture-resistant oleate wax which may comprise copper oleate, petrolatum, paraffin and cresylic acid may be served on the cable. A cable which is somewhat less expensive but which still possesses the desired characteristics to a great extent may be made by omitting the folded paper tape or by substituting therefor a paper or cloth tape saturated with a compound containing copper oleate and a filler such as sulfur or a sulfur compound. Over this fibrous sheath 21 another coat 22 of putty is applied. This coat is wiped to leave a relatively thick unbroken film of caulking material over the tape.

Finally a tough and strong sheath 23 of a fibrous stranded material such as pressure saturated jute is closely and tightly served, finished with a waterproofing compound 24 such, for example, as asphalt and covered with soapstone or talc 25.

Figure 3:
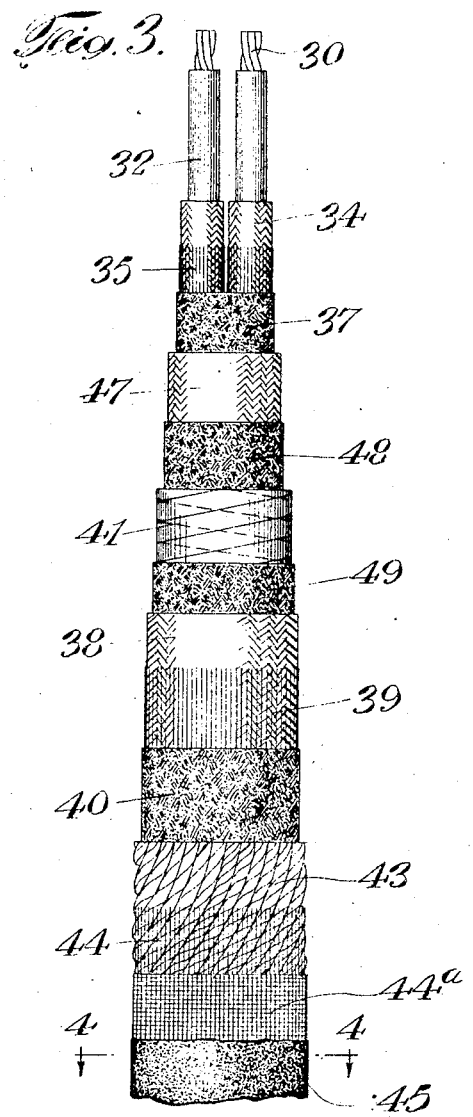
Fig. 3 is a plan view similar to Fig. 1 but showing a modified form of cable.
Figure 4:
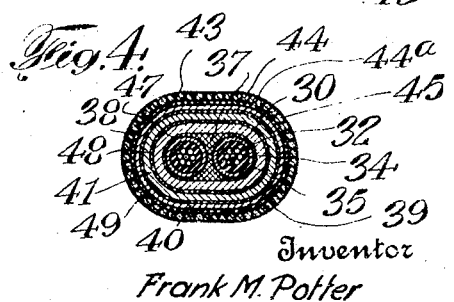
Fig. 4 is a cross section taken on the line 4—4 of Fig. 3.

The cable illustrated in Figs. 3 and 4 comprises conductors 30 each provided with a rubber sheath 32. A cotton braid 34 impregnated with a waterproofing saturant 35 is formed over the rubber sheath 32. This may, if desired, be coated for each individual conductor with the fatty acid base putty but, as shown, the individual coating is omitted and only the valley filling and assembly coating sheath 37 of putty is applied. A cotton braid 47 is next applied, followed by a saturation of material similar to 15 and a coat 48 of putty. By making the cotton braid quite open and providing a coating of putty on both sides, the wicking of moisture along the cotton braid is greatly minimized, particularly where an outer cover of asbestos braid is provided as will be noted.

Next a sheath 41 of moistureproofed kraft paper or other fibrous moistureproofing material is wrapped about the cable. This is covered with putty 49 and an asbestos braid 38 is formed over the latter. The braid is treated with a moistureproof saturant 39 similar to that indicated at 15 and given a heavy surface coating 40 of putty. A tightly wound twisted twine sheath 43 is next applied and this sheath is saturated with a substance 44 similar to 15, covered with a coating of moistureproofing material 44a such as asphalt, and finally a coating of talc or soapstone 45 is dusted over the cable. Pressure impregnated jute may be substituted for the twine, in which case the saturant 44 is omitted.

The embodiment of the invention in either of the forms described provides a homogeneous compact structure which is relatively inexpensive to manufacture and yet possesses qualities quite superior to those of the usual metallic covered cables provided for this purpose and qualities which have not been produced at all in any other non-metallic conductor heretofore proposed.

Although only two embodiments of the invention have been shown and described herein it will be understood that the invention may be variously modified and embodied within the scope of the appended claims.

What I claim is:

1. An article of manufacture comprising in combination, metallic electrical conductors, a surrounding sheath of paper for each conductor, a sheath of rubber for each conductor over said paper, a serving of rubberized tape for each conductor over said rubber, a cotton braid saturated with waterproofing material over said tape, a coating of oxidation- and moisture-resistant compound containing stearin pitch and asbestine wiped over said braid for each conductor, a valley filling and overall covering of said compound for said assembled conductors, an asbestos braid sheath for the cable over said compound, a waterproofing material and a coat of said compound applied to said asbestos sheath, an oleate impregnated paper sheath, a coating of said compound over said oleate paper sheath, a jute cord serving over said compound and waterproofing material and talc applied upon said jute serving.

2. An article of manufacture comprising in combination, metallic electrical conductors, a surrounding sheath of rubber insulating compound for each of said conductors, a putty compound including stearin pitch and asbestine filling the valleys between adjacent covered conductors and covering the assembled conductors, a fabric braid over said compound coating, a coating of said putty compound over said braid, a moistureproofed paper tape sheath between layers of said putty compound and a jute sheath covering the whole.

3. An article of manufacture comprising in combination, a plurality of separately insulated electrical conductors, a putty compound including a fatty acid pitch and asbestine filling the valleys between and covering said several conductors in assembly, and an asbestos braid saturated by and disposed between coatings of said compound, and a fabric jacket surrounding the whole.

4. An article of manufacture comprising in combination, a metallic electrical conductor, a rubber sheath encasing said conductor, a protection for said rubber sheath comprising a braid and a plastic compound coating for said braid, a further protecting casing comprising a braid and paper tape each covered on either side with said compound, and a fabric jacket over the whole, said compound comprising a fatty acid pitch and a mineral filler.

5. An article of manufacture comprising a non-metallic protecting covering comprising a substantially non-wicking fibrous sheath impregnated with and disposed adjacent a layer of plastic oxidation- and moisture-resistant compound, said compound including a fatty acid pitch together with a mineral filler.

6. An article of manufacture comprising in combination, a plurality of insulated electrical conductors, a plastic compound filling the valleys between said conductors, said compound being resistant to heat, oxidation, moisture, earth acids and alkalis and retaining its plastic state for prolonged periods of time, and a fibrous jacket enclosing the whole.

7. An article of manufacture comprising in combination, a plurality of insulated electrical conductors, and a protecting covering therefor comprising a plastic compound including stearin pitch and asbestine filling the valleys between said conductors and a substantially non-wicking fibrous sheath.

8. An article of manufacture comprising in combination, a plurality of insulated electrical conductors, a plastic compound including stearin pitch, asbestos and asbestine filling the valleys between said conductors, and a sheath of mineral fiber surrounding the whole.

9. An article of manufacture comprising, in combination, a pair of conductors, separate covering means for each conductor including a coating of an oxidation- and moisture-resistant compound, and a common protective covering for both conductors including a valley filler of said compound.

10. An article of manufacture comprising, in combination, a pair of conductors, separate protecting means for each conductor including a coating of an oxidation- and moisture-resistant compound, and a common protective covering for both conductors including a valley filler of said compound, an asbestos sheath and a layer of said compound surrounding said asbestos sheath.

11. An article of manufacture comprising, in combination, a pair of conductors, separate protecting means for each conductor including a coating of oxidation- and moisture-resistant compound, and a common protective covering for both conductors including an asbestos sheath impregnated with said compound and an additional separate coating of said compound.

12. An article of manufacture comprising, in combination, a metallic electrical conductor and a covering therefor, said covering including a fibrous coating and an oxidation- and moisture-resistant compound impregnating and covering the same, said compound including a fatty acid pitch and magnesium silicate.

13. An article of manufacture comprising, in combination, a metallic electrical conductor and a covering therefor, said covering including a plurality of fibrous coatings and an oxidation- and moisture-resistant compound impregnating and separating the coatings, said compound including a fatty acid pitch and magnesium silicate.

14. An article of manufacture comprising, in combination, a metallic electrical conductor and a covering therefor, said covering including a fibrous coating and an oxidation- and moisture-resistant plastic compound covering the same, said compound including a base of fatty acid pitch and a mineral filler.

15. An article of manufacture comprising, in combination, a metallic electrical conductor and a covering therefor, said covering including a fibrous coating and an oxidation- and moisture-resistant compound impregnating and covering the same, said compound including asbestine and stearin pitch.

16. An article of manufacture comprising, in combination, a metallic electrical conductor and a covering therefor, said covering including a plurality of fibrous coatings and an oxidation- and moisture-resistant compound separating the coatings, said compound including a base of fatty acid pitch and a mineral filler.

17. An article of manufacture comprising, in combination, a metallic electrical conductor and a covering therefor, said covering including a plurality of fibrous coatings and an oxidation- and moisture-resistant compound impregnating and separating the coatings, said compound including asbestine and stearin pitch.

18. An article of manufacture comprising a metallic conductor, and protective means comprising a protective body and a plastic oxidation- and moisture-resistant compound including a fatty acid pitch and a mineral filler.

19. An article of manufacture comprising a metallic conductor and covering therefor comprising a fibrous material and a plastic compound including stearin pitch and an asbestos-like filler.

20. An article of manufacture comprising, in combination, a metallic conductor, and a covering therefor comprising a compound remaining plastic throughout wide temperature changes, said compound including a fatty acid pitch and a mineral filler.

21. An article of manufacture comprising, in combination, a plurality of electrical conductors associated together so as to form valleys therebetween, and a valley filler therefor comprising a plastic compound resistant to heat, oxidation and moisture and retaining 22. An article of manufacture comprising, in combination, a plurality of electrical conductors, and a valley filler therefor comprising a plastic compound including a fatty acid pitch base and a mineral filler.

23. An article of manufacture comprising, in combination, a plurality of electrical conductors, and a plastic compound in the valleys between said conductors, said compound including stearin pitch and magnesium silicate.

24. An article of manufacture comprising, in combination, a plurality of electrical conductors associated together so as to form valleys therebetween, and a protecting covering therefor, including a compound resistant to heat and to moisture and retaining its plastic state for indefinite periods of time, said compound being disposed in the valleys between said conductors.

25. An article of manufacture comprising, in combination, a plurality of electrical conductors, and a protecting covering therefor, including an oxidation- and moisture-resistant compound positioned in the valleys between said conductors and characterized by continued plasticity with wide temperature changes so as to tend to migrate toward and heal bruises or ruptures in said covering.

26. An article of manufacture comprising, in combination, a metallic electrical conductor, a protecting covering over said conductor including a fibrous jacket and a plastic insulating oxidation- and moisture-resistant compound over said conductor, said compound including a fatty acid pitch and a mineral filler, and a fibre jacket over the whole.

27. An article of manufacture comprising, in combination, a plurality of separately insulated conductors and a common protective covering for said conductors including a fibrous jacket, a plastic oxidation- and moisture-resistant compound and a surrounding fibrous jacket having a moisture-proofing compound applied thereto.

28. An article of manufacture comprising in combination, a plurality of separately insulated conductors having a waterproofing saturant applied thereto, a coating of an oxidation- and moisture-resistant compound over said plurality of conductors and extending into the valleys therebetween, and a protective covering surrounding the whole.

29. An article of manufacture comprising in combination an insulated metallic electrical conductor, and a protective covering therefor, said covering including a sheath of non-wicking fibrous material, and a protective layer of an oxidation- and moisture-resistant plastic compound adjacent to and impregnating said sheath, said compound tending to seal automatically such openings as may occur in said covering.

30. An article of manufacture comprising in combination, an insulated metallic electrical conductor and a covering therefor, said covering including a plurality of layers of non-wicking fibrous material, and a self-healing oxidation- and moisture-resistant plastic compound impregnating and separating said layers.

In testimony whereof, I have signed my name to this specification this 2nd day of February, 1928.

FRANK M. POTTER.